(12) United States Patent
Ohtsu et al.

(10) Patent No.: US 7,983,005 B2
(45) Date of Patent: *Jul. 19, 2011

(54) THIN FILM MAGNETIC HEAD WITH FLYING HEIGHT ADJUSTMENT CAPABILITY

(75) Inventors: Takayoshi Ohtsu, Kanagawa (JP); Nobumasa Nishiyama, Kanagawa (JP)

(73) Assignee: Hitachi Global Storage Technologies Netherlands BV, Amsterdam (NL)

( * ) Notice: Subject to any disclaimer, the term of this patent is extended or adjusted under 35 U.S.C. 154(b) by 1098 days.

This patent is subject to a terminal disclaimer.

(21) Appl. No.: 11/787,097

(22) Filed: Apr. 12, 2007

(65) Prior Publication Data

US 2008/0014467 A1    Jan. 17, 2008

(30) Foreign Application Priority Data

Apr. 12, 2006    (JP) ................. 2006-109714

(51) Int. Cl.
G11B 5/31        (2006.01)
G11B 5/60        (2006.01)

(52) U.S. Cl. .................................... 360/234.5

(58) Field of Classification Search ............ 360/125.31, 360/125.74, 294.7, 123.36, 123.57, 234.5
See application file for complete search history.

(56) References Cited

U.S. PATENT DOCUMENTS

| 7,068,468 B2 * | 6/2006 | Kamijima ................ 360/128 |
| 7,088,543 B2 | 8/2006 | Satoh et al. |
| 7,095,587 B2 | 8/2006 | Kurita et al. |
| 7,097,110 B2 * | 8/2006 | Sheperek et al. ............ 236/1 C |
| 7,113,369 B2 * | 9/2006 | Ota et al. ................... 360/234.5 |
| 7,133,254 B2 * | 11/2006 | Hamann et al. .......... 360/125.74 |
| 7,199,982 B2 * | 4/2007 | Suk ............................ 360/294.7 |
| 7,330,336 B2 * | 2/2008 | Luo et al. ................. 360/125.31 |
| 7,542,236 B2 * | 6/2009 | Ota et al. ................... 360/234.5 |
| 2002/0191326 A1 * | 12/2002 | Xu et al. ........................ 360/75 |
| 2004/0165305 A1 * | 8/2004 | Nishiyama ..................... 360/75 |
| 2006/0034013 A1 * | 2/2006 | Kato et al. .................... 360/128 |

FOREIGN PATENT DOCUMENTS

| JP | 2004-030723 A | 1/2004 |
| JP | 2004-192742 | 7/2004 |
| JP | 2004-342151 | 12/2004 |

* cited by examiner

*Primary Examiner* — Angel A. Castro
(74) *Attorney, Agent, or Firm* — Burton IP Law Group; Daphne L. Burton (57) ABSTRACT

For a Tunneling Magnetoresistive (TMR) element, an electrode is used as a magnetic shield or vice versa. This can pose a problem in that noise from a heater source or electromagnetic induction has a direct influence on the TMR element, namely, on a read signal. According to one embodiment of the present invention, however, a thin film head portion has an insulating film, a heater, an electromagnetic shield, a read element, and a write element laminated in this order from the side of a slider. Insulating films isolate the constituent elements above from each other, and a protection film covers the group mentioned above. The heater is a thin film resistive element made of NiCr or the like, and is disposed above the insulating film. The electromagnetic shield is a magnetic film made of permalloy or the like, and covers the heater. The read element comprises a lower shield and electrode, a TMR element, and an upper shield and electrode. The write element comprises a lower magnetic pole piece, an upper magnetic pole piece, and a coil formed therebetween. The thin film head portion is formed with a common terminal.

11 Claims, 6 Drawing Sheets

THIN FILM MAGNETIC HEAD WITH FLYING HEIGHT ADJUSTMENT CAPABILITY

CROSS-REFERENCE TO RELATED APPLICATION

The instant nonprovisional patent application claims priority to Japanese Application No. 2006-109714, filed Apr. 12, 2006 and incorporated by reference in its entirety herein for all purposes.

BACKGROUND OF THE INVENTION

A magnetic disk drive includes a rotating magnetic disk and a thin film magnetic head supported by a suspension and positioned in a radial direction of the magnetic disk. The magnetic head reads and writes magnetic data from and to the magnetic disk while relatively traveling over the magnetic disk. The slider of the magnetic head is designed to fly through the assistance of an air lubrication bearing, that is, an air wedge film effect, so that the slider does not come into direct contact with the magnetic disk. In order to realize higher recording density of a magnetic disk drive, and thereby increased capacity and reduced size thereof, it is effective to increase line recording density by reducing a distance between the slider and the magnetic disk, namely, the flying height of the slider.

The conventional design of flying height of a slide has allowed for a decrease in flying height resulting from machining variations, a temperature difference of usage environment, a difference in flying height between read and write and the like and has been provided with a flying height margin in order to prevent contact between the slider and the disk even under the worst conditions. If a slider is used having a capability of adjusting a flying height according to the use conditions for each thin magnetic head, it is possible to eliminate the margin mentioned above and thereby significantly reduce a flying height of a read/write element while preventing the contact between the slider and the disk. Japanese Laid-Open Patent No. 2004-342151 ("Patent Document 1") proposes a slider structure in which a heater made of a thin film resistive element is provided in the vicinity of a write element and a read element, heats part of the slider as necessary to thermally expand for protrusion, thus adjusting a distance between the write element and the read element, and a magnetic recording medium.

However, if the heater is provided to adjust flying height, then the number of lines in the read and write elements and the number of terminals disposed on the rear end face of the head will be increased. Also the number of lines on the suspension connected to the terminals is increased, thus narrowing each spacing between the lines. This poses a problem of crosstalk from the write element lines to the read element lines during writing. In order to solve the problem of crosstalk, Japanese Laid-Open Patent No. 2004-192742 ("Patent Document 2") discloses structures in which read element lines are disposed to be put between heater lines on a suspension and in which heater lines are disposed between write element lines and read element lines on the suspension.

As described in Patent Document 2, the structures in which read element lines are disposed between the heater lines and in which heater lines are disposed between write element lines and read element lines, can avoid an adverse affect of crosstalk current on the read element due to a high-frequency current of the write element or due to a heater current turned on and off. If a TMR (Tunneling Magnetoresistive) element is used as read element, however, it uses an electrode as a magnetic shield or vice versa. This poses a problem in that noise applied to the heater lines due to noise from a heater source or electromagnetic induction, has a direct influence on the TMR element, namely, on a read signal.

BRIEF SUMMARY OF THE INVENTION

For a TMR element, an electrode is used as a magnetic shield or vice versa. This poses a problem in that noise from a heater source or electromagnetic induction has a direct influence on the TMR element, namely, on a read signal. According to the particular embodiment of the present invention disclosed in FIG. 1, however, a thin film head portion 1b has an insulating film 150, a heater 4, an electromagnetic shield 50, a read element 2 and a write element 3 laminated in this order from the side of a slider 1a, insulating films 152 isolating the constituent elements above from each other, and a protection film 154 covering the group mentioned above. The heater 4 is a thin film resistive element made of NiCr or the like and is disposed above the insulating film 150. The electromagnetic shield 50 is a magnetic film made of permalloy or the like and covers the heater 4. The read element 2 comprises a lower shield and electrode 21, a TMR element 23 and an upper shield and electrode 24. The write element 3 comprises a lower magnetic pole piece 31, an upper magnetic pole piece 33 and a coil 35 formed therebetween. The thin film head portion 1b is formed with a common terminal C.

DETAILED DESCRIPTION OF THE INVENTION

Embodiments in accordance with the present invention relate to a thin film magnetic head mounted on a magnetic disk drive, and particularly to a thin film magnetic head having a flying height adjustment capability.

Embodiments in accordance with the present invention reduce an electromagnetic adverse affect of a heater on a read element of a thin film magnetic head.

A typical thin film magnetic head includes a slider; and a thin film head portion provided on a trailing end face of the slider and having a heater, a read element, a write element, a protection film, and an electromagnetic shield provided between the heater and the read element.

The read element includes a lower shield and electrode, an upper shield and electrode, and a TMR (Tunneling Magnetoresistive) element disposed between the lower shield and electrode and the upper shield and electrode. The electromagnetic shield is provided between the lower shield and electrode and the heater.

Further, the thin film magnetic head of the invention includes: a common terminal provided at a position near a track-widthwise central portion of the thin film head portion; read element terminals, write element terminals, a heater terminal and a ground terminal provided on an end face of the thin film head portion, the heater terminal and the ground terminal being located on both sides of the read element terminals and write element terminals; and ground lines of the electromagnetic shield. The read element and the write element are connected to the common terminals and ground lines of the common terminal, and the slider and the heater are connected to the ground terminal.

Embodiments of the present invention can reduce an electromagnetic adverse affect of a heater on a read element of a thin film magnetic head.

Particular embodiments of the present invention will be hereunder described with reference to the drawings. Note that like reference numerals denote like or corresponding elements in all the drawings and duplicated explanation is omitted for the sake of clarification.

Figure 7:
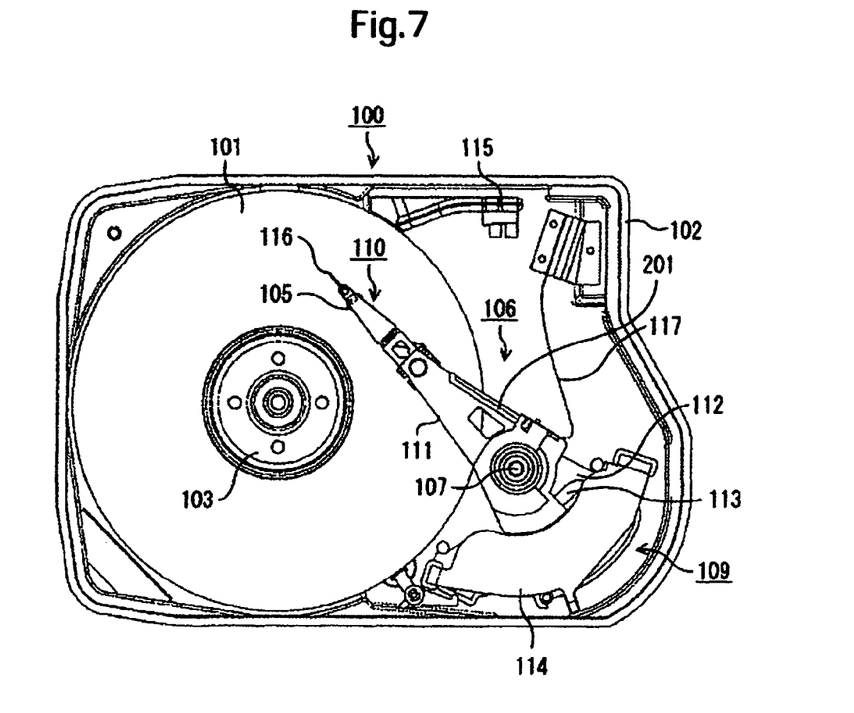
FIG. 7 is a plan view of a hard disk drive on which the thin film magnetic head according to embodiments of the present invention is mounted.

The entire construction of a hard disk drive (HDD) will first be described to facilitate the understanding of the present invention. FIG. 7 is a schematic plan view illustrating the configuration of the HDD. The HDD 100 includes a magnetic disk 101 as a recording medium adapted to record data therein. The magnetic disk 101 is a nonvolatile memory which stores date therein by magnetizing a magnetic layer. The constituent elements of the HDD 100 are accommodated in a base 102. The base 102 is fixed via a gasket (not shown) to a cover (not shown) closing the upper opening of the base 102 to form a disk enclosure, in which all the constituent elements are housed sealingly.

The magnetic disk 101 is fixed to a spindle motor 103. The thin film magnetic head 105 has a head element portion adapted to read and/or write data from and/or to the magnetic disk 101, the data being input/output to/from a host (not shown). The head element portion includes a write element and/or a read element and a slider having the write element and/or the read element formed on the surface thereof. The write element converts an electric signal to a magnetic field in accordance with data written to the magnetic disk. The read element converts an electric field from the magnetic field to an electric signal.

The actuator 106 holds and moves the thin film magnetic head 105. The actuator 106 is pivotally held by a pivot shaft 107 and driven by a voice coil motor (VCM) as a driving mechanism. The actuator 106 includes constituent members such as a suspension 110, an arm 111, a coil support 112 and a flat coil 113, which are connected in this order from the longitudinal leading end having the magnetic head 105 disposed thereon. Note that the configuration of the suspension 110 will be detailed later. The VCM 109 comprises flat coil 113, a stator magnet (not shown) fixed to an upper magnetic holding plate 114, and a stator magnet (not shown) fixed to a lower stator magnetic holding plate.

The magnetic disk 101 is held in an integrated manner by the spindle motor 103 fixed to the bottom surface of the base 102 and rotationally driven by the spindle motor 103 at a desired speed. The magnetic disk 101 is rotated counterclockwise in FIG. 7. When the HDD is inoperative, the magnetic disk 101 stands still. The VCM 109 permits the actuator 106 to pivot about the pivot shaft 107 transversely in response to a driving signal coming from a controller (not shown) to the flat coil 113. Thus, the actuator 106 can move the magnetic head 105 above the magnetic disk 101.

In order to read/write data from/to the magnetic disk 101, the actuator 106 moves the magnetic head 105 to above the data area on the surface of the rotating magnetic disk 101. The pivotal movement of the actuator 106 moves the magnetic head 105 along the radial surface of the magnetic disk 101. Thus, the magnetic head 105 can access a desired track. A signal between the magnetic head 105 and controller is transmitted by a trace 201 or a transmitting line and a FPC 117. The magnetic head 105 flies above the magnetic disk 101 at a fixed gap therebetween when equilibrium is established between the pressure resulting from viscosity of air between the ABS (air bearing surface) of the slider facing the magnetic disk 101 and the rotating magnetic disk 101, and the pressure of the suspension 110 applied toward the magnetic disk 101.

When the magnetic disk 101 stops rotating, the magnetic head 105 will come into contact with the surface of the magnetic disk 101. This may produce a problem in that an absorbing phenomenon causes a scratch or flaw on the data area of the magnetic disk 101 or causes the magnetic disk to be unable to rotate. To prevent such a problem, the actuator 106 allows the magnetic head 105 to withdraw from the data area onto a ramp mechanism 115 when the rotation of the magnetic disk 101 stops. The actuator 106 is turned toward the ramp mechanism 115, and a tab 116 formed at the tip of the actuator slidingly moves on the surface of the ramp mechanism 115 and then rests on the parking surface of the ramp mechanism 115. Thus, the magnetic head 105 is unloaded. When the magnetic head 105 is loaded, the tab 116 having rested on the parking surface leaves the ramp mechanism 115 and then the magnetic head 105 moves to above the surface of the magnetic disk 101.

It should be noted that while adopting the load and unload system, the HDD described above may adopt the CSS (contact start and stop) system. In the CSS system, while the magnetic head 105 does not perform a data read/write process, it withdraws in a zone arranged in the inner circumference of the magnetic disk 101. In the above description, the HDD has the single magnetic disk 101 having one recording surface for the sake of simplicity. However, the HDD may be provided with a single or a plurality of recording magnetic disks each having two recording surfaces.

Figure 8:
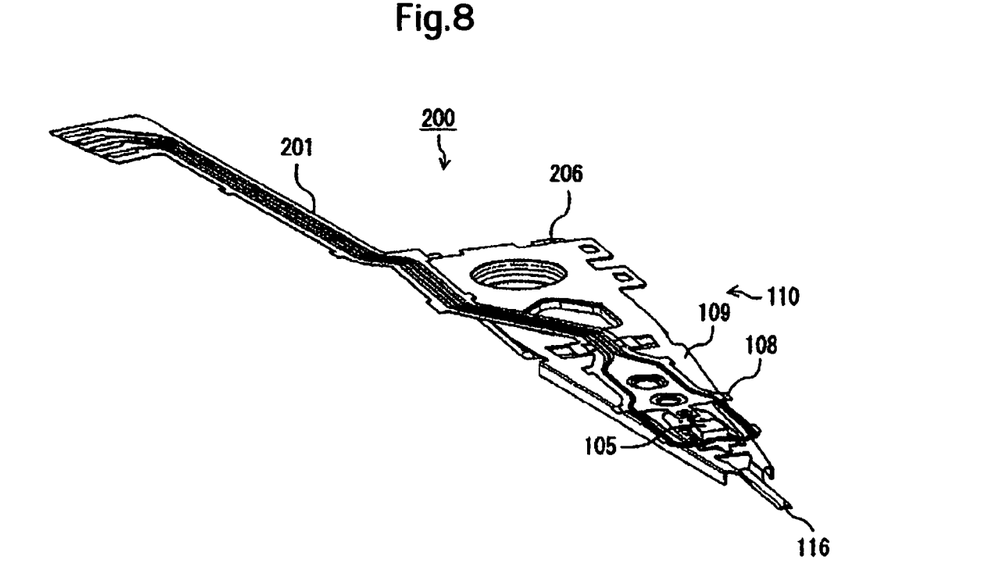
FIG. 8 is a perspective view of a head gimbal assembly holding the thin film magnetic head according to embodiments of the present invention.

Next, a description is made of the configuration of a head gimbal assembly (HGA) with the thin film magnetic head 105 attached to the suspension 110 with reference to FIG. 8. FIG. 8 illustrates the structure of the HGA as viewed from the recording surface of the magnetic disk. The HGA 200 includes the magnetic head 105, the suspension 110 and the trace 201 or a transmitting line. The suspension 110 includes a flexible gimbal 108, a load beam 109 and a mount plate 206. The gimbal 108 holds the magnetic head 105 on the side facing the magnetic disk. The load beam holds the gimbal 108 on the side facing the magnetic disk. The HGA 200 in FIG. 8 is of the load and unload type and has the tab 116 located at the leading end of the load beam 109 for withdrawal onto the ramp mechanism. The magnetic head 105 is formed at its trailing end face (the tab side) with a plurality of terminals connected to the head element portion. The terminals are each connected to a corresponding one of the lines of the trace 201 using soldering, gold ball bonding or the like.

Figure 2:
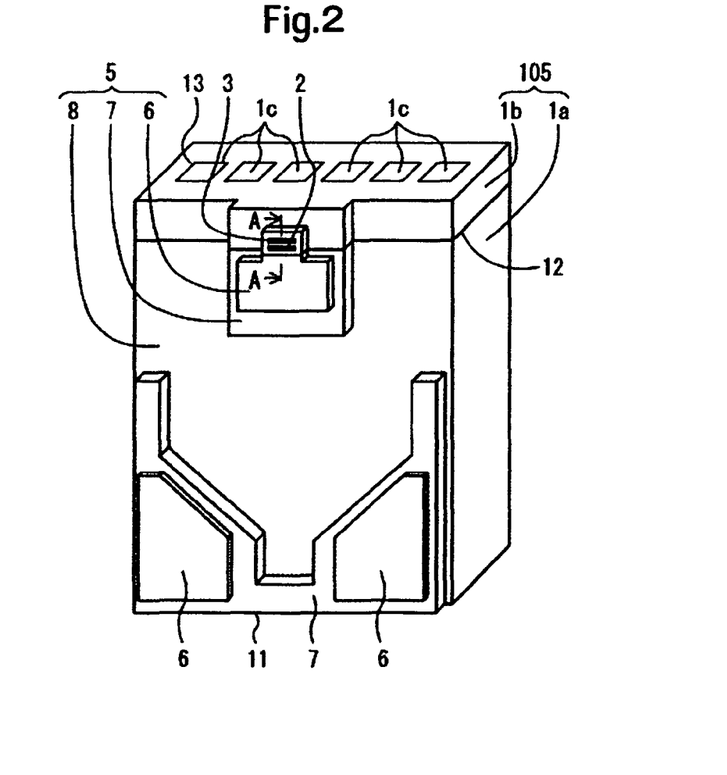
FIG. 2 illustrates the entire configuration of the thin film magnetic head according to an embodiment of the present invention.

A description is next made of a configuration of the thin film magnetic head 105 according to an embodiment of the present invention with reference to FIG. 2. The magnetic head 105 is composed of a substrate (slider) 1a and a thin film head portion 1b. The slider 1a is of an approximately rectangular parallelepiped and is composed of an air bearing surface 5, a leading end face 11, a trailing end face 12, both lateral surfaces and back surfaces, namely, six surfaces in total. For instance, the magnetic head 105 measures 1.25 mm in length, 1.0 mm in width, and 0.3 mm in thickness. The thin film head portion 1b is formed with a plurality of terminals 1c at its end face 13. The air bearing surface 5 has fine steps (step bearings) formed by ion milling so as to serve as an air bearing which faces the magnetic disk to generate air pressure therebetween, thereby carrying a load applied to the back of the air bearing surface.

The steps of the air bearing surface is classified into three kinds of surfaces parallel substantially to each other: rail surfaces 6 nearest to the disk; lower rail surfaces 7 or step bearing surfaces lower than the rail surfaces 6 by about 100 to 200 nm; a lowest surface 8 lower than the rail surfaces 6 by about 1 µm. When entering the rail surfaces 6 from the lower rail surfaces 7 or the step bearing (surface), an air stream caused by the rotation of the disk is compressed by a tapered passage with its edge narrowed to produce a positive air pressure. On the other hand, when the air stream enters the lowest surface 8 from the rail surfaces 6 and lower rail surfaces 7, a negative air pressure is produced by the expanded passage.

The thin film magnetic head 105 is designed to fly such that flying height of a leading end side is greater than that of a trailing end side. Thus, the rail surface 6 near the end face 13 comes closest to the disk. Near the end face 13 the rail surface 6 projects relative to the lower rail surface 7 and the lowest surface 8 surrounding the rail surface 13. Therefore, unless the pitch and roll attitudes of the slider incline in excess of a certain limit, the rail surface 6 will come closest to the disk. The read element 2 and the write element 3 are formed on a portion of the rail surface 6 belonging to the thin film head portion 1b. The shape of the step bearing is designed so that a load applied from the load beam 109 may balance with positive and negative air pressures produced on the air bearing surface 5, whereby a distance between the write element 3 and the read element 2 and the disk can be maintained at an appropriate value equal to about 10 nm or less. Incidentally, the thin film magnetic head 105 described above, has the two-step bearing slider in which the air bearing surface 5 is composed of the three kinds of surfaces. However, the head 105 is not limited to this configuration and it may have a three-step slider in which the air bearing surface 5 is composed of four or more kinds of parallel surfaces.

Figure 1:
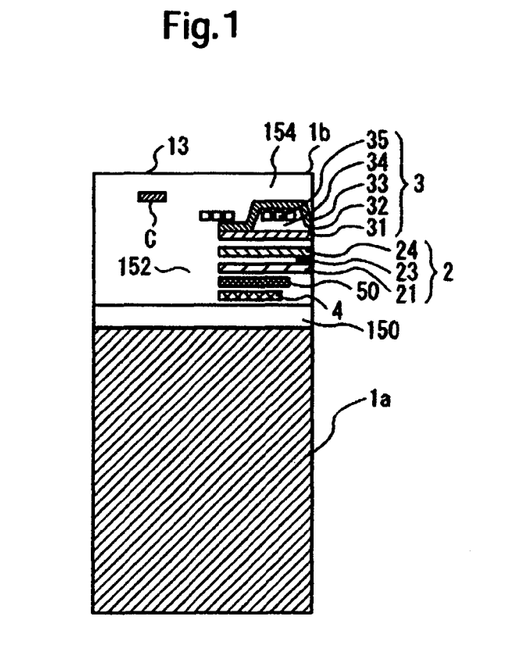
FIG. 1 is a cross-sectional view illustrating the configuration of a thin film head portion of a thin film magnetic head according to an embodiment of the present invention (a cross-sectional view taken along line A-A of FIG. 2).
Figure 3:
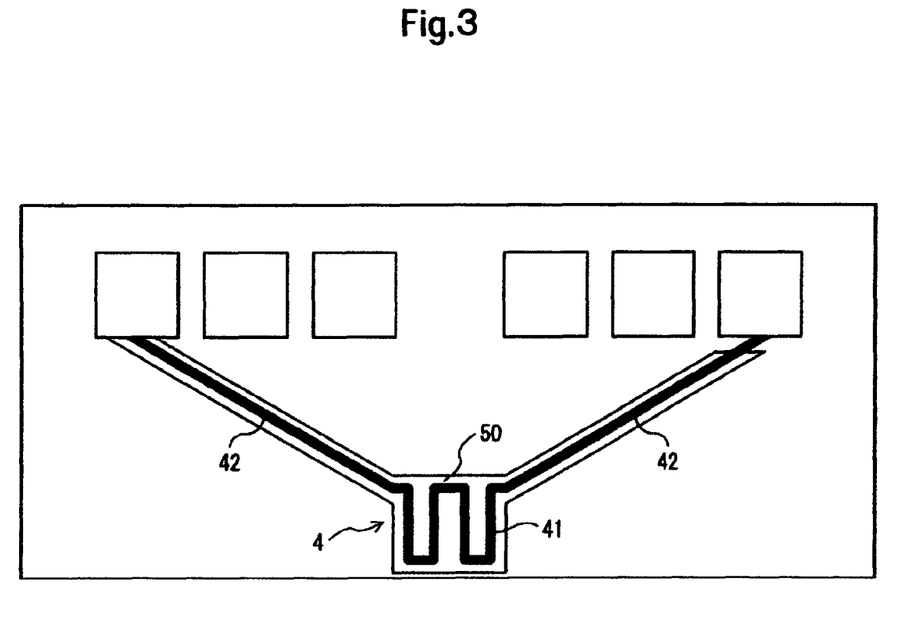
FIG. 3 is a schematic diagram illustrating the arrangement relationship between a heater and an electromagnetic shield.

Next, a description is made of the internal configuration of the thin film head portion 1b formed on the slider 1a with reference to FIG. 1 or a cross-sectional view taken along line A-A of FIG. 2. The thin film head portion 1b includes an alumina insulating film 150, a heater 4, an electromagnetic shield 50, the read element 2 and the write element 3 laminated in this order from the side of the slider 1a, insulating films (alumina) 152 isolating the constituent elements above from each other, and a protection film (alumina) 154 covering the whole mentioned above. The heater 4 is a thin film resistive element made of NiCr or the like and is disposed above the alumina insulating film 150. The electromagnetic shield 50 is a magnetic film made of permalloy or the like formed above a thin film resistive element 41 and a lead 42 constituting the heater 4 as shown in FIG. 3 or a schematic diagram as viewed from the end face 13. The area of a magnetic film constituting the electromagnetic shield 50 may be larger than that of the heater 4 so that the magnetic film can cover the entire heater. Returning to FIG. 1, the read element 2 includes a lower shield and electrode 21, a TMR (tunneling magnetoresistive) element 23, and an upper shield and electrode 24. The write element 3 includes a lower magnetic pole piece 31, an upper magnetic pole piece 33, and a coil 35. The upper magnetic pole piece 33 has a magnetic gap 32 formed on the air bearing surface side and is magnetically connected to the lower magnetic pole piece 31 at the rear portion thereof. The coil 35 is formed between the lower magnetic pole piece 31 and the upper magnetic pole piece 34 via an interlayer insulating film 34. In addition, the thin film head portion 1b is provided with a common terminal C described later.

The thin film magnetic head 105 of this type is called a TFC (thermal flying control) head. This magnetic head 105 can adjust a distance (flying height) between the read element 2 and write element 3 and the magnetic disk by the following way. An electrical current is applied to the heater 4 as necessary to heat and thermally expand the insulating film (alumina) 152 covering the read element 2 and write element 3, thereby causing the read element 2 and write element 3 to protrude toward the air bearing surface side. Incidentally, in the configuration described above, the heater 4 and electromagnetic shield 50 are disposed between the insulating film 150 and the read element 2. However, embodiments in accordance with the present invention are not limited to this example. The heater 4 needs only to be located at a position near or in the vicinity of the read element 2, or it may be located rearward the read element 2 and write element 3. In addition, the electromagnetic shield 50 needs only to be located at a position where the heater 4 is electromagnetically insulated from the read element 2.

According to the embodiments described above, the electromagnetic noise from the heater source and noise applied to the lead 42 due to electromagnetic induction are interrupted by the electromagnetic shield 50. Therefore, the influence of the TMR element 23 on the shield and electrodes 21, 24 can be reduced.

Figure 4:
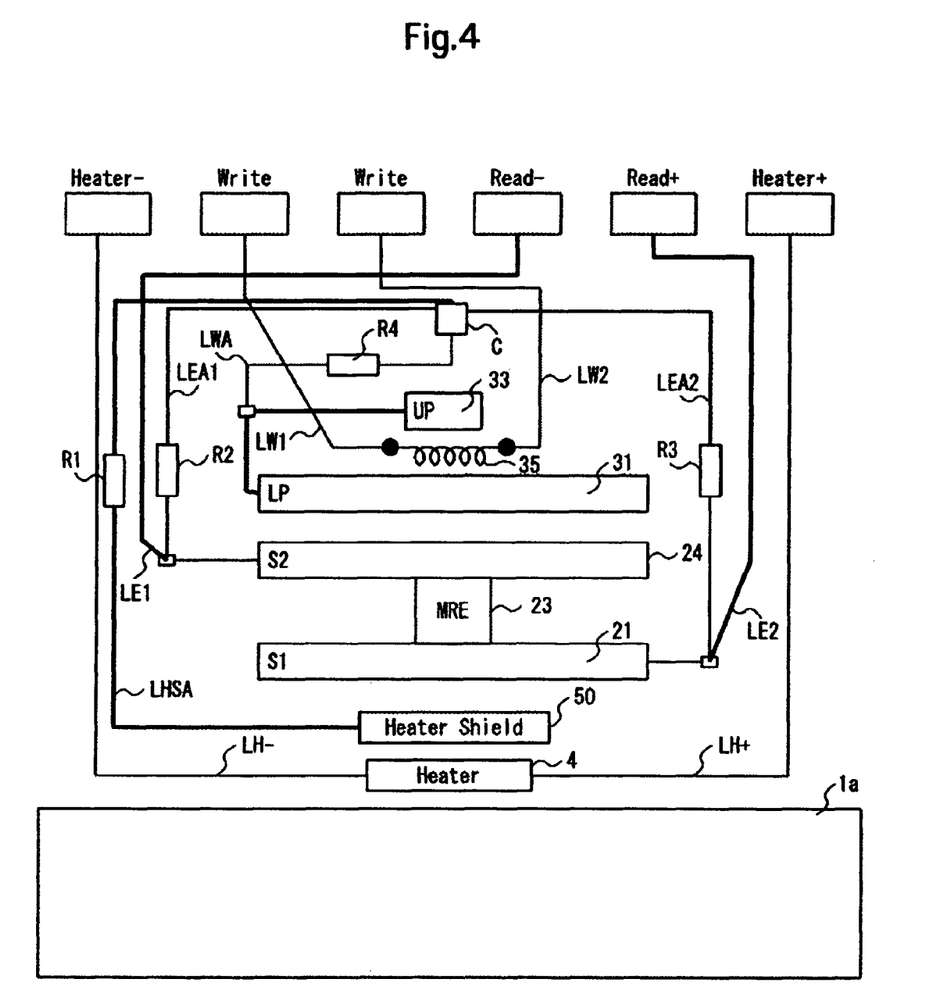
FIG. 4 is a schematic diagram of the wiring structure of the head elements and terminals of the thin film head portion as viewed from the air bearing surface.

Next, a description is made of a wiring structure of the thin film magnetic head according to the embodiment described above with reference to FIGS. 4 to 6. FIG. 4 is a schematic diagram illustrating the wiring and terminals 1c of the head element portion included in the thin film magnetic head 105 as viewed from the air bearing surface. The terminals 1c are arranged in the following order from the left end of the thin film head portion 1b: a heater terminal H− (Heater−), a write element terminal W (Write), another write element terminal W (Write), a read element terminal R− (Read−), another read element terminal R+ (Read+), and another heater terminal H+ (Heater+). Needless to say, the heater terminal H− and the heater terminal H+ may be arranged reversely. In addition, the two write element terminals W and the two read element terminals R(−), R(+) may be arranged reversely.

In FIG. 4, the two write element terminals W are respectively connected to lines LW1, LW2 extending from both the ends of the coil 35. The read element terminal R− is connected to a lead wire LE1 extending from the upper shield and electrode 24 for the TMR element 23. The read element terminal R+ is connected to a lead wire LE2 extending from the lower shield and electrode 21 for the TMR element 23. The heater terminal H+ is connected to a heater line LH+ and the heater terminal H− is connected to a heater line LH−.

The common terminal C is provided at a position near the track-widthwise central portion of the thin film head portion 1b. A ground line LHSA of the electromagnetic shield 50 is connected to the common terminal C via a resistor R1. A ground line LEA1 of the upper shield and electrode 24 for the TMR element 23 is connected to the common terminal C via a resistor R2. A ground line LEA2 of the lower shield and lower electrode 21 for the TMR element 23 is connected to the common terminal C via a resistor R3. A ground line LWA for the upper and lower magnetic pole pieces 31, 33 is connected to the common terminal C via a resistor R4. Such connection reduces a difference in shunt resistance between the left and right lead wires LE1 and LE2 with respect to the common terminal C. Therefore, even if exogenous noise from the magnetic disk or the like is applied to each ground line, crosstalk noise applied to the lead wires LE1, LE2 can be reduced.

Figure 5:
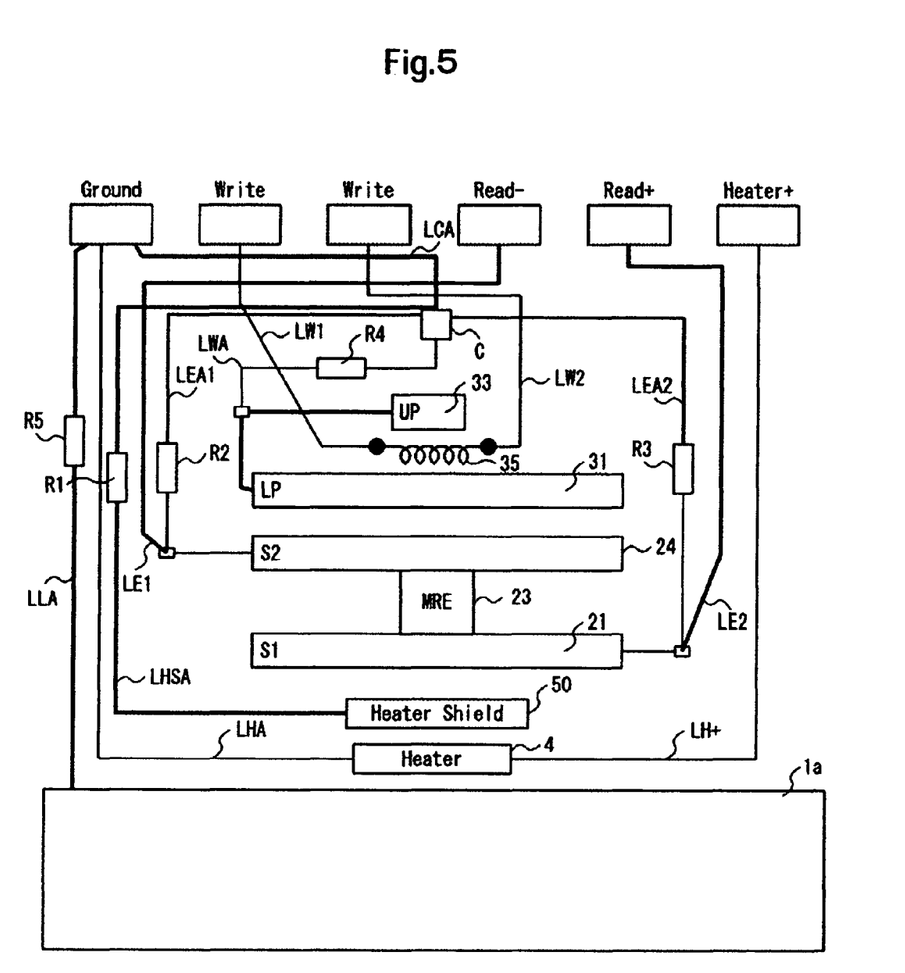
FIG. 5 is a schematic diagram of the wiring structure of the head elements and terminals of the thin film head portion by way of another example as viewed from the air bearing surface.

FIG. 5 is a schematic diagram illustrating an example in which a single heater terminal H+ (Heater+) and a single ground terminal G are respectively disposed at both ends of the end face 13 as viewed from the air bearing surface. The terminals 1c are arranged in the following order from the left end of the thin film head portion 1b: a ground terminal G (Ground), a write element terminal W (Write), another write element terminal W (Write), a read element terminal R− (Read−), another read element terminal R+ (Read+), and a heater terminal H+ (Heater+). The two write element terminals W are respectively connected to lines LW1, LW2 extending from both ends of the coil 35. The read element terminal R− is connected to a lead wire LE1 extending from the upper shield and electrode 24 for the TMR element 23. The read element terminal R+ is connected to a lead wire LE2 extending from the lower shield and electrode 21 for the TMR element 23. The heater terminal H+ is connected to a heater line LH+ extending from the heater 4. Needless to say, the ground terminal G and the heater terminal H+ may be arranged reversely. In addition, the two write element terminals W and the two read element terminals R(−), R(+) are arranged reversely.

The common terminal C is provided at a position near the track-widthwise central portion of the thin film head portion 1b. A ground line LHSA of the electromagnetic shield 50 is connected to the common terminal C via a resistor R1. A ground line LEA1 of the upper shield and electrode 24 for the TMR element 23 is connected to the common terminal C via a resistor R2. A ground line LEA2 of the lower shield and lower electrode 21 for the TMR element 23 is connected to the common terminal C via a resistor R3. A ground line LWA for the upper and lower magnetic pole pieces 31, 33 is connected to the common terminal C via a resistor R4.

The ground line LCA of the common terminal C is connected to a ground terminal G. In addition, the ground line LHA of the heater 4 is connected to the ground terminal G and the ground line LLA of the slider 1a is connected to the ground terminal G via a resistance 5. Such connection reduces a difference in shunt resistance between the left and right lead wires LE1 and LE2 with respect to the common terminal C. Therefore, even if noise from the magnetic disk is applied to the ground line LLA of the slider 1a, crosstalk noise applied to the lead wires LE1, LE2 can be reduced.

Figure 6:
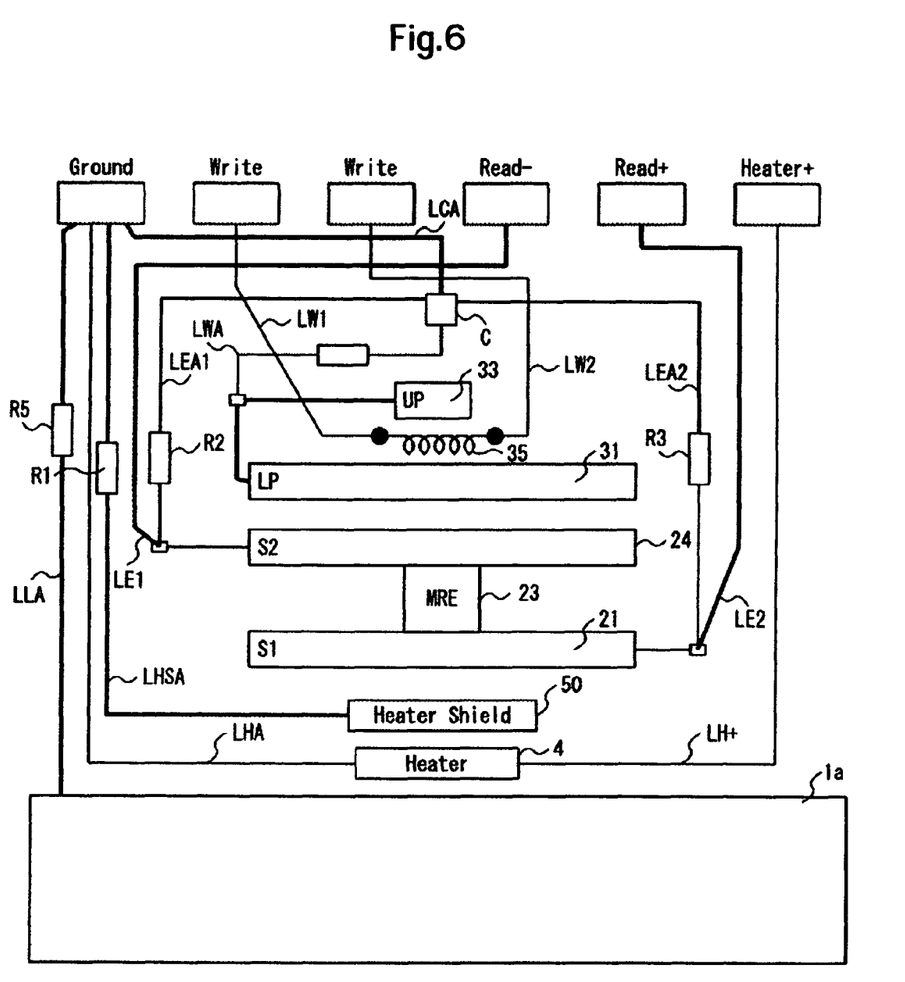
FIG. 6 is a schematic diagram of the wiring structure of the head elements and terminals of the thin film head portion by way of another example as viewed from the air bearing surface.

FIG. 6 illustrates a modification of the wiring structure shown in FIG. 5. This modification is different from the wiring structure of FIG. 5 in that the ground line LHSA of the electromagnetic shield 50 is directly connected to the ground terminal G, not via the common terminal C. Also such a connecting structure can reduce a difference in shunt resistance between the left and right lead wires LE1, LE2 with respect to the common terminal C. Therefore, even if noise from the magnetic disk is applied to the ground line LLA of the slider 1a, crosstalk noise applied to the lead wires LE1, LE2 can be reduced.

In the wiring structures shown in FIGS. 4 to 6, the common terminal C is provided at a position near the upper central portion of the head element portion in the thin film head portion 1b. If the end face 13 of the thin film head portion 1b has a margin, however, the common terminal C may be disposed between the write element terminal W and the read element terminal R−.

As described above, according to the embodiments of the present invention, the electromagnetic shield is provided between the heater and the read element (the TMR element). Therefore, electromagnetic noise from the heater source or noise applied to the lead due to electromagnetic induction can be interrupted by the electromagnetic shield. This can reduce an influence on the shield and electrode for the TMR element. In addition, the thin film head portion is provided with the common terminal, the ground line from each element is once connected to the common terminal and then the ground line of the common terminal is connected to the ground terminal. Therefore, a difference in shunt resistance is reduced between the left and right lead wires. Accordingly, even if noise from the magnetic disk or the like is applied to the ground line via the slider, or even if exogenous noise is applied to each ground line, crosstalk occurring in the lead wire adjacent to the associated ground line can be reduced.

What is claimed is:

1. A thin film magnetic head comprising:
   a slider; and
   a thin film head portion provided on a trailing end face of the slider and including a heater, a read element, a write element, a protection film covering the heater, and an electromagnetic shield provided between the heater and the read element;
   a common terminal provided at a position near a track-widthwise central portion of the thin film head portion; and
   read element terminals, write element terminals, a heater terminal and a ground terminal provided on an end face of the thin film head portion, the heater terminal and the ground terminal being located on both sides of the read element terminals and write element terminals;
   wherein ground lines of the read element and the write element are connected to the common terminal and ground lines of the electromagnetic shield, common terminal, the slider and the heater are connected to the ground terminal.

2. The thin film magnetic head according to claim 1, wherein the thin film head portion includes the heater, the electromagnetic shield, the read element, the write element, and the protection film which are laminated in this order from the trailing end face of the slider.

3. The thin film magnetic head according to claim 1, wherein the heater includes a thin film resistive element and lead wires extending from both ends of the thin film resistive element, and the electromagnetic shield is provided to cover at least the thin film resistive element and the lead wires.

4. The thin film magnetic head according to claim 1, wherein a magnetic film constituting the electromagnetic shield has an area larger than that of the heater.

5. The thin film magnetic head according to claim 1, wherein the read element includes a lower shield and electrode, an upper shield and electrode, and a TMR (Tunneling Magnetoresistive) element disposed between the lower shield and electrode and the upper shield and electrode, and the electromagnetic shield is provided between the lower shield and electrode and the heater.

6. A thin film magnetic head comprising:
a slider;
a thin film head portion laminatedly provided on a trailing end of the slider and including a heater, an electromagnetic shield, a read element, a write element and a protection film covering the heater, the electromagnetic shield, the read element and the write element;
a common terminal provided at a position near a track-widthwise central portion of the thin film head portion; and
read element terminals, write element terminals and heater terminals provided on an end face of the thin film head portion, the heater terminals being located on both sides of the read element terminals and write element terminals;
wherein ground lines of the electromagnetic shield, the read element and the write element are connected to the common terminal.

7. A thin film magnetic head according to claim 6, wherein the common terminal is located between the read element terminals and the write element terminals on the end face of the thin film head portion.

8. The thin film magnetic head according to claim 6, wherein the read element includes a lower shield and electrode, an upper shield and electrode, and a TMR (Tunneling Magnetoresistive) element disposed between the lower shield and electrode and the upper shield and electrode, and the electromagnetic shield is provided between the lower shield and electrode and the heater.

9. A thin film magnetic head comprising:
a slider;
a thin film head portion laminatedly provided on a trailing end of the slider and including a heater, an electromagnetic shield, a read element, a write element and a protection film covering the heater, the electromagnetic shield, the read element and the write element;
a common terminal provided at a position near a track-widthwise central portion of the thin film head portion; and
read element terminals, write element terminals, a heater terminal and a ground terminal provided on an end face of the thin film head portion, the heater terminal and the ground terminal being located on both sides of the read element terminals and write element terminals;
wherein ground lines of the electromagnetic shield, the read element and the write element are connected to the common terminal and ground lines of the common terminal, the slider and the heater are connected to the ground terminal.

10. The thin film magnetic head according to claim 9, wherein the read element includes a lower shield and electrode, an upper shield and electrode, and a TMR (Tunneling Magnetoresistive) element disposed between the lower shield and electrode and the upper shield and electrode, and the electromagnetic shield is provided between the lower shield and electrode and the heater.

11. The thin magnetic head according to claim 9, wherein the ground line of the electromagnetic shield is directly connected to the ground terminal, not to the common terminal.

* * * * *